United States Patent
Zhang

(10) Patent No.: US 11,096,127 B2
(45) Date of Patent: Aug. 17, 2021

(54) METHOD AND DEVICE IN UE AND BASE STATION FOR TRANSMIT POWER CONTROL

(71) Applicant: XiaoBo Zhang, Shanghai (CN)

(72) Inventor: XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 38 days.

(21) Appl. No.: 16/589,161

(22) Filed: Oct. 1, 2019

(65) Prior Publication Data

US 2020/0037268 A1 Jan. 30, 2020

Related U.S. Application Data

(63) Continuation of application No. PCT/CN2017/080369, filed on Apr. 13, 2017.

(51) Int. Cl.
*H04W 52/36* (2009.01)
*H04L 5/00* (2006.01)
(Continued)

(52) U.S. Cl.
CPC ............ *H04W 52/36* (2013.01); *H04L 5/0051* (2013.01); *H04W 52/242* (2013.01); *H04W 56/001* (2013.01); *H04W 72/0473* (2013.01)

(58) Field of Classification Search
CPC . H04W 52/36; H04W 52/242; H04W 56/001; H04W 72/0473; H04W 52/223;
(Continued)

(56) References Cited

U.S. PATENT DOCUMENTS

2005/0075125 A1\* 4/2005 Bada ............... H04W 48/20
455/525
2011/0019648 A1 1/2011 Huang et al.
(Continued)

FOREIGN PATENT DOCUMENTS

CN 101527586 A 9/2009
CN 101965031 A 2/2011
(Continued)

OTHER PUBLICATIONS

CN First Search Report in application No. 201780087727.X dated Feb. 21, 2020.
(Continued)

*Primary Examiner* — Afshawn M Towfighi

(57) ABSTRACT

The disclosure provides a method and a device in a User Equipment (UE) and a base station for terminal-to-terminal communication. The UE first receives K downlink radio signals, and then transmits a first radio signal. A transmit power value of the first radio signal is a first power value. The K downlink radio signals are associated with K synchronization sequences respectively. The downlink radio signal includes at least one of a downlink reference signal or a synchronization signal, or the downlink radio signal includes a downlink signaling. The K downlink radio signals are used for determining the first power value. Any two of the K synchronization sequences are different. The K is a positive integer greater than 1. A relationship is established between the first power value and the K downlink radio signals, ensuring that transmissions of the UE will not produce strong interferences to neighbor cells.

12 Claims, 8 Drawing Sheets

(51) Int. Cl.
*H04W 52/24* (2009.01)
*H04W 56/00* (2009.01)
*H04W 72/04* (2009.01)

(58) Field of Classification Search
CPC ... H04W 52/367; H04W 4/70; H04W 52/243; H04W 72/042; H04W 72/085; H04L 5/0051; H04L 5/0048; H04L 5/0053
See application file for complete search history.

(56) References Cited

U.S. PATENT DOCUMENTS

| | | | |
|---|---|---|---|
| 2011/0164524 A1 | 7/2011 | Kawamoto et al. | |
| 2013/0343218 A1* | 12/2013 | Pajukoski | H04W 52/18 370/252 |
| 2014/0087782 A1 | 3/2014 | Zhang et al. | |

FOREIGN PATENT DOCUMENTS

| | | |
|---|---|---|
| CN | 102244923 A | 11/2011 |
| CN | 103024884 A | 4/2013 |
| CN | 103518405 | 1/2014 |
| CN | 103518405 A | 1/2014 |
| JP | 2013157936 A | 8/2013 |

OTHER PUBLICATIONS

CN First Office Action in Application No. 201780087727.X dated Feb. 26, 2020.
CN Notice of Allowance in Application No. 201780087727.X dated Mar. 25, 2020.
CN Supplementary Search Report in application No. 201780087727.X dated Mar. 19, 2020.
ISR received in application No. PCT/CN2017/080369 dated Dec. 6, 2017.

* cited by examiner

METHOD AND DEVICE IN UE AND BASE STATION FOR TRANSMIT POWER CONTROL

CROSS-REFERENCE TO RELATED APPLICATION

This application is a continuation of International Application No. PCT/CN2017/080369, filed Apr. 13, 2017, the full disclosure of which is incorporated herein by reference.

BACKGROUND

Technical Field

The disclosure relates to transmission methods and devices in wireless communication, and in particular to a transmission method and device in transmit power control.

RELATED ART

In the 3rd Generation Partner Project (3GPP) R12, Device to Device (D2D) communication is approved and discussed. The nature of the D2D is to allow data transmission between UEs. In conventional D2D communication, considering the robustness of D2D transmission and interferences to cellular communication, a transmit power on a sidelink is only related to a path loss between a transmitting end of the D2D transmission and a serving cell.

In discussions about 5G in 3GPPP, a Study Item (SI) of Enhanced Support for Aerial Vehicles has been approved and discussed in 3GPP. One feature of air communication is that transmissions of one air terminal device will be detected by multiple base stations, correspondingly, relevant methods for transmit power control need to be reconsidered.

SUMMARY

One important feature of air communication is that a terminal located in air, after reaching a certain height, generally has a Line of Sight (LOS) to a ground terminal and a base station. Due to reasons of LOS, when an air terminal in a target cell communicates with a ground terminal corresponding to the air terminal or the target cell, neighbor cells and ground terminals in neighbor cells can both receive signals coming from the air terminal, thereby causing large inter-cell interferences.

In current LTE D2D application scenarios, the Transmit Power Control (TPC) of a D2D transmitting end is related to a path loss between the D2D transmitting end and a base station. The above TPC method is to ensure that transmissions on a sidelink will not produce interferences to cellular links. The communication between an air terminal and a ground terminal in air communication to a great extent will inherit the transmission protocols of LTE D2D communication. However, the TPC methods for D2D obviously will bring large inter-cell interferences.

In view of the above problems, the disclosure provides a solution. It should be noted that the embodiments of the disclosure and the characteristics in the embodiments may be mutually combined arbitrarily if no conflict is incurred. For example, the embodiments of the UE of the disclosure and the characteristics in the embodiments may be applied to the base station, and vice versa.

The disclosure provides a method in a UE for wireless communication, wherein the method includes:
receiving K downlink radio signals; and
transmitting a first radio signal.

Herein, a transmit power value of the first radio signal is a first power value; the K downlink radio signals are associated with K synchronization sequences respectively; the downlink radio signal includes at least one of a downlink reference signal or a synchronization signal, or the downlink radio signal includes a downlink signaling; the K downlink radio signals are used for determining the first power value; any two of the K synchronization sequences are different; and the K is a positive integer greater than 1.

In one embodiment, the above method is characterized in that: when the K downlink radio signals correspond to K different cells respectively, the first power value is determined on the basis that no neighbor cell interferences are produced to uplink receptions at the K different cells. Herein, the K different cells are neighbor cells of a serving cell in which the UE is camped.

In one embodiment, the above method is further characterized in that: when the K downlink radio signals correspond to K different ground terminals respectively, the first power value is determined on the basis that no neighbor cell interferences are produced to receptions at the K different ground terminals. Herein, the K different ground terminals are ground terminals in neighbor cells of a serving cell in which the UE is camped.

In one embodiment, the above method has the following benefit: when the UE determines a transmit power value, the UE not only considers a reception at a ground user at an opposite end of the UE or a reception at a serving base station of the UE, but also considers interferences to neighbor cells or ground users in neighbor cells. This method avoids that the transmission of an air terminal produces interferences to cells in multiple regions on ground or ground terminals, thereby improving transmission rate and spectrum efficiency of system.

In one embodiment, the first radio signal is transmitted on a Physical Sidelink Shared Channel (PSSCH).

In one embodiment, the first radio signal is transmitted on a Physical Sidelink Control Channel (PSCCH).

In one embodiment, the first radio signal is transmitted on a Physical Sidelink Discovery Channel (PSDCH).

In one embodiment, the first radio signal is transmitted on a Physical Sidelink Broadcasting Channel (PSBCH).

In one embodiment, the first radio signal is transmitted on a Physical Uplink Shared Channel (PUSCH).

In one embodiment, the first radio signal is transmitted on a Physical Uplink Control Channel (PUCCH).

In one embodiment, the first radio signal is transmitted on a New Radio PUSCH (N-PUSCH).

In one embodiment, the first radio signal is transmitted on a New Radio PUCCH (N-PUCCH).

In one embodiment, the first radio signal includes a Discovery Reference Signal (DRS).

In one embodiment, the first radio signal includes at least one of a Primary Sidelink Synchronization Signal (PSSS) or a Secondary Sidelink Synchronization Signal (SSSS).

In one embodiment, the first radio signal includes a Sounding Reference Signal (SRS).

In one embodiment, the first radio signal includes an uplink Demodulation Reference Signal (DMRS).

In one embodiment, a target receiver of the first radio signal includes at least the former one of a terminal or a base station.

In one subembodiment, the terminal is a terminal for terrestrial radio access.

In one embodiment, the K downlink radio signals include a first downlink radio signal and a second downlink radio signal, the first downlink radio signal includes a downlink signaling among a downlink reference signal, a synchronization signal or a downlink signaling, and the second downlink radio signal includes a downlink reference signal among a downlink reference signal, a synchronization signal or a downlink signaling.

In one embodiment, the downlink reference signal includes at least one of a Common Reference Signal (CRS), a Mobility Reference Signal (MRS), a Phase Tracking Reference Signal (PTRS), a Channel State Information-Reference Signal (CSI-RS), a DMRS, a DRS, or a Narrow-Band Reference Signal (NRS).

In one embodiment, the synchronization signal includes at least one of a Primary Synchronization Signal (PSS), a Secondary Synchronization Signal (SSS), a PSSS or an SSSS.

In one embodiment, the downlink signaling is a physical layer signaling.

In one embodiment, the downlink signaling includes a TPC field.

In one embodiment, the downlink signaling is Downlink Control Information (DCI) including a TPC field.

In one embodiment, the synchronization sequence is used for determining a first-type identifier, and the first-type identifier is an integer.

In one subembodiment, the first-type identifier is one Physical Cell Identifier (PCI).

In one subembodiment, the first-type identifier corresponds to one cell uniquely.

In one subembodiment, the first-type identifier corresponds to one base station uniquely.

In one subembodiment, the first-type identifier corresponds to one Transmission Reception Point (TRP) uniquely.

In one embodiment, the K downlink radio signals come from K different nodes respectively, and the node is one of a cell, a base station or a TRP.

In one embodiment, the downlink radio signal comprises a downlink reference signal, the first-type identifier is used for generating a reference signal sequence corresponding to a given downlink reference signal, and the given downlink reference signal is the downlink reference signal included by the downlink radio signal.

In one subembodiment, the first-type identifier is used for initiating a generator of a first-type sequence, and the first-type sequence is used for generating a reference signal sequence corresponding to the given downlink reference signal.

In one affiliated embodiment of the above subembodiment, the given downlink reference signal is a CRS, the first-type identifier is a PCI and the first-type identifier corresponds to the $N_{ID}^{cell}$ in Chapter 6.10.1.1 in TS 36.211, the first-type sequence corresponds to the c(2m) and c(2m+1) in Chapter 6.10.1.1 in TS 36.211, the reference signal sequence corresponds to the $r_{l,n_s}(m)$ in Chapter 6.10.1.1 in TS 36.211, and the $r_{l,n_s}(m)$ is expressed as below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$

m=0,1, . . . , $2N_{RB}^{max,DL}-1$

Herein, the phrase that the first-type identifier is used for initiating a generator of a first-type sequence refers that: the generator of the first-type sequence is initiated by a $c_{init}$ when each Orthogonal Frequency Division Multiplexing (OFDM) symbol starts. The $c_{init}$ is equal to $2^{10} \cdot (7 \cdot (n'_s+1)+l+1) \cdot (2 \cdot N_{ID}^{cell}+1)+2 \cdot N_{ID}^{cell}+N_{CP}$. The $n_s$ is a label of a slot in which the reference signal sequence is located in one wireless frame, and the l is a sequence number of an OFDM symbol in which the reference signal sequence is located in one slot. The $n'_s$ and $N_{CP}$ are equal to the following formulas respectively. The $N_{RB}^{max,DL}$ corresponds to largest downlink bandwidth configuration.

$$n'_s = \begin{cases} 10\lfloor n_s/10 \rfloor + n_s \bmod 2 & \text{Subframe structure 3 and CRS is one part of DRS} \\ n_s & \text{Other} \end{cases}$$

$$N_{CP} = \begin{cases} 1 & \text{Normal } CP \\ 0 & \text{Extended } CP \end{cases}$$

In one affiliated embodiment of the above subembodiment, the given downlink reference signal is a CSI-RS, the first-type identifier corresponds to the $N_{ID}^{CSI}$ in Chapter 6.10.5.1 in TS 36.211, the first-type sequence corresponds to the c(2m) and c(2m+1) in Chapter 6.10.5.1 in TS 36.211, the reference signal sequence corresponds to the $r_{l,n_s}(m)$ in Chapter 6.10.5.1 in TS 36.211, and the $r_{l,n_s}(m)$ is expressed as below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$

m=0,1, . . . , $N_{RB}^{max,DL}-1$

Herein, the phrase that the first-type identifier is used for initiating a generator of a first-type sequence refers that: the generator of the first-type sequence is initiated by a $c_{init}$ when each OFDM symbol starts. The $c_{init}=2^{10} \cdot (7 \cdot (n'_s+1)+l+1) \cdot (2 \cdot N_{ID}^{CSI}+1)+2 \cdot N_{ID}^{CSI}+N_{CP}$. The $n_s$ is a label of a slot in which the reference signal sequence is located in one wireless frame, and the l is a sequence number of an OFDM symbol in which the reference signal sequence is located in one slot. The $n'_s$ and $N_{CP}$ are equal to the following formulas respectively. The $N_{RB}^{max,DL}$ corresponds to largest downlink bandwidth configuration.

$$n'_s = \begin{cases} 10\lfloor n_s/10 \rfloor + n_s \bmod 2 & \text{Subframe structure 3 and CRS is one part of DRS} \\ n_s & \text{Other} \end{cases}$$

$$N_{CP} = \begin{cases} 1 & \text{Normal } CP \\ 0 & \text{Extended } CP \end{cases}$$

In one embodiment, the downlink radio signal includes a downlink signaling, the first-type identifier is used for generating a scrambling sequence, the scrambling sequence is used for scrambling a given downlink signaling, and the given downlink signaling is the downlink signaling included in the downlink radio signal.

In one subembodiment, the signal of the given downlink signaling before scrambling b(i), the signal of the given downlink signaling after scrambling is b̃(i) the scrambling sequence is c(i), an initial value of the scrambling sequence is $c_{init}$, the first-type identifier is a PCI and is equal to $N_{ID}^{cell}$, $c_{init}=\lfloor n_s/2 \rfloor 2^9+N_{ID}^{cell}$, and b̃(i)=(b(i)+c(i))mod 2.

In one embodiment, the downlink radio signal includes a synchronization signal, and the synchronization sequence is used for generating a synchronization signal included in the associated downlink radio signal.

In one embodiment, the synchronization sequence includes at least one of a pseudorandom sequence or a Zadoff-Chu sequence.

In one embodiment, the synchronization sequence corresponds to a PSSS, and a root index of the synchronization sequence is equal to one of 26 or 37.

In one embodiment, the synchronization sequence corresponds to an SSSS, in a subframe #0 the synchronization sequence corresponds to $N_{ID}^{(1)}=N_{ID}^{SL} \bmod 168$, the synchronization sequence corresponds to $N_{ID}^{(2)}=\lfloor N_{ID}^{SL}/168 \rfloor$, and the $N_{ID}^{SL} \in \{0, 1, \ldots, 335\}$.

In one embodiment, the synchronization signal corresponds to a NarrowBand PSS (NPSS), and a root index of a ZC sequence corresponding to the synchronization sequence is equal to 5.

In one embodiment, the synchronization signal corresponds to a NarrowBand SSS (NSSS), and the synchronization sequence is generated according to a method in Chapter 10.2.7.2 in TS 36.211.

In one embodiment, the synchronization signal corresponds to a New Radio PSS (NR-PSS), and the synchronization sequence is a pure BPSK M sequence with a length of 127.

In one subembodiment, the NR-PSS is generated through one polynomial, and the polynomial corresponds to decimal 145.

In one affiliated embodiment of the above subembodiment, the phrase that the polynomial corresponds to decimal 145 refers that the polynomial is $g(x)=x7+x4+1$.

In one subembodiment, the NR-PSS frequency domain acquires three PSS signals through three cyclic shifts (0, 43, 86).

In one subembodiment, an initial poly shift register value of the NR-PSS is binary 1110110.

In one embodiment, any two of the K synchronization signals correspond to different synchronization sequences, and the synchronization sequence includes one first-type sequence or one second-type sequence.

In one subembodiment, the first-type sequence is a pseudorandom sequence, and the second-type sequence is a Zadoff-Chu sequence.

In one subembodiment, the first-type sequence is a pseudorandom sequence, and the second-type sequence is a pseudorandom sequence.

In one subembodiment, the first-type sequence is a Zadoff-Chu sequence, and the second-type sequence is a Zadoff-Chu sequence.

In one embodiment, at least one subcarrier is occupied by all the K synchronization signals.

In one embodiment, the K synchronization signals are transmitted in a same bandwidth.

In one embodiment, the K synchronization signals are transmitted in a same system bandwidth.

In one embodiment, the K synchronization signals are transmitted on a same carrier.

In one embodiment, the K synchronization signals are transmitted on same time-frequency resources.

In one embodiment, the first power value is in unit of dBm.

In one embodiment, the first power value is in unit of mW.

In one embodiment, the synchronization signal is generated after the corresponding synchronization sequence is processed in sequence through a resource element mapper or a generator of OFDM symbols.

In one embodiment, the synchronization signal is generated after the corresponding synchronization sequence is processed in sequence through precoding, a resource element mapper or a generator of OFDM symbols.

Specifically, according to one aspect of the disclosure, the above method includes:

receiving K information groups.

Herein, the K information groups correspond to K transmitters respectively, and the K transmitters transmit the K downlink radio signals respectively; the information group includes at least one of a maximum transmit power value, an expected power value or a compensation factor; the first power value is a minimum power value among K reference power values, and the K reference power values are one-to-one corresponding to the K information groups.

In one embodiment, the above method is characterized in that: the K reference power values are power values acquired based on path losses from the UE to the K transmitters respectively, thus, the first radio signal transmitted based on any one given reference power value among the K reference power values will not produce interferences to a transmitter corresponding to the given reference power value.

In one embodiment, the above method is further characterized in that: the first power value is a minimum power value among K reference power values, so as to ensure that the transmission of the UE does not cause strong interferences to all the K transmitters.

In one embodiment, the step A1 is located before the step B.

In one embodiment, the information group further includes an identifier of a corresponding transmitter.

In one subembodiment, the identifier is a PCI.

In one subembodiment, the identifier is one of a Public Land Mobile Network Identifier (PLMN ID) or an E-UTRAN Cell Global Identifier (ECGI). The E-UTRAN represents Evolved Universal Terrestrial Radio Access Network.

In one subembodiment, the identifier is a non-negative integer.

In one embodiment, the expected power value is in unit of dBm.

In one embodiment, the maximum transmit power value is in unit if dBm.

In one embodiment, the compensation factor is not less than 0 but not greater than 1.

In one embodiment, a transmitter of the K information groups is one of the K transmitters.

In one embodiment, a transmitter of the K information groups is a serving cell of the UE.

In one embodiment, a transmitter of the K information groups is a serving base station of the UE.

In one embodiment, a transmitter of the K information groups is a TRP corresponding to the UE.

In one embodiment, a transmitter of the K information groups is a terminal associated with the UE.

In one subembodiment, the terminal associated with the UE is an opposite-end terminal which performs D2D communication with the UE.

In one subembodiment, a serving cell of the terminal associated with the UE is one of the K transmitters.

In one embodiment, transmitters of the K downlink radio signals are cells associated with the UE.

In one subembodiment, the cells associated with the UE are cells which belong to one same cell group as a serving cell of the UE.

In one affiliated embodiment of the above subembodiment, a backhaul link exists between any two cells in the cell group.

In one affiliated embodiment of the above subembodiment, all cells in the cell group are Quasi Co-Located (QCLed) for the UE.

In an example of the affiliated embodiment, the phrase that a given cell and a target cell are QCLed for the UE refers that: the UE can deduce large-scale properties of channels of radio signals transmitted by the target cell from large-scale properties of channels of radio signals from the given cell. The large-scale property include one or more of delay spread, doppler spread, doppler shift, average gain, average delay, angle of arrival or angle of departure.

In one embodiment, transmitters of the K downlink radio signals are terminals having neighbor cell interferences for the UE.

In one subembodiment, the terminals having neighbor cell interferences for the UE refers that: the terminals are served by neighbor cells of a serving cell of the UE, and the terminals can receive radio signals transmitted by the UE.

In one embodiment, the reference power value is a minimum power value among the maximum transmit power value indicated by the corresponding information group and a comparative power value, or the reference power value is the maximum transmit power value indicated by the corresponding information group. The comparative power value is in linear correlation with the expected power value indicated by the corresponding information group, and the comparative power value is in linear correlation with the compensation factor indicated by the corresponding information group.

In one subembodiment, a linear coefficient between the comparative power value and the compensation factor indicated by the corresponding information group is a corresponding path loss.

In one subembodiment, a linear coefficient between the comparative power value and the expected power value indicated by the corresponding information group is 1.

In one embodiment, a target information group is one of the K information groups, the target information group includes at least one of a target maximum transmit power value, a target expected power value or a target compensation factor, and a target reference power value corresponds to the target information group. The downlink signaling corresponding to the target information group includes a TPC field, and the TPC field is equal to 1. The target reference power value is determined by the following formula.

$$P_0 = \min\{P_1, 10\ \log_{10}(M) + P_2 + \alpha \cdot PL\}$$

where $P_0$ corresponds to the target reference power value, $P_1$ corresponds to the target maximum transmit power value, M corresponds to a frequency band width occupied by the first radio signal, $P_2$ corresponds to the target expected power value, $\alpha$ corresponds to the target compensation factor, PL corresponds to a path loss of a radio link from a transmitter corresponding to the target information group to the UE.

In one embodiment, a target information group is one of the K information groups, the target information group includes at least one of a target maximum transmit power value, a target expected power value or a target compensation factor, and a target reference power value corresponds to the target information group. The downlink signaling corresponding to the target information group includes a TPC field, and the TPC field is equal to 0, or the UE belongs to a sidelink transmission mode 2. The target reference power value is determined by the following formula.

$$P_0 = P_1$$

where $P_0$ corresponds to the target reference power value, $P_1$ corresponds to the target maximum transmit power value.

In one embodiment, the K information groups include a first information group and (K−1) information groups. The first information group corresponds to a first node, the first information group includes at least one of the expected power value or the compensation factor for the first node, and the first information group does not include the maximum transmit power value for the first node. The (K−1) information groups correspond to (K−1) candidate nodes respectively, the (K−1) information groups include at least the maximum transmit power values among the maximum transmit power values, the expected power values or the compensation factors for the (K−1) candidate nodes respectively.

In one subembodiment, the K transmitters include the first node, and the (K−1) candidate nodes are transmitters among the K transmitters other than the first node.

In one subembodiment, the first node is one of a serving cell, a serving base station or a corresponding TPR of the UE.

In one subembodiment, the candidate node is a cell other than a serving cell of the UE.

In one subembodiment, the candidate node is a base station other than a serving base station of the UE.

In one subembodiment, the candidate node is a TRP other than a serving TRP of the UE.

In one subembodiment, the candidate node is a terminal located outside a serving cell of the UE.

In one subembodiment, the maximum transmit power value corresponding to the first information group is predefined.

In one subembodiment, the maximum transmit power value corresponding to the first information group is not indicated through a higher-layer signaling.

In one subembodiment, the maximum transmit power value corresponding to the first information group is related to a band to which the first radio signal belongs.

In one subembodiment, the maximum transmit power value corresponding to the first information group is related to a modulation mode employed by the first radio signal.

In one subembodiment, the maximum transmit power value corresponding to the first information group is related to a channel bandwidth to which the first radio signal belongs.

Specifically, according to one aspect of the disclosure, the above method includes:

determining K1 path loss(es).

Herein, K1 downlink radio signal(s) is(are) used for determining the K1 path loss(es) respectively; the K1 downlink radio signal(s) is(are) a subset of the K downlink radio signals, the K1 downlink radio signal(s) all comprise(s) at least one of the downlink reference signal or the synchronization signal, and the K1 is a positive integer not greater than the K; the K1 path loss(es) is(are) used for determining K1 reference power value(s), and the K1 reference power value(s) is(are) a subset of the K reference power values.

In one embodiment, the above method is characterized in that: the UE calculates the K1 reference power values only, reducing the complexity of implementation of the UE.

In one embodiment, the first power value is not greater than a minimum power value among the K1 reference power values.

In one subembodiment, the K1 is equal to the K, and the first power value is equal to a minimum power value among the K power values.

In one embodiment, no signal among the K downlink radio signals other than the K1 downlink radio signals includes at least one of the downlink reference signal or the synchronization signal.

In one embodiment, for any given reference power value among the K1 reference power values, the given reference power value is equal to a minimum power value among the maximum transmit power value indicated by the corresponding information group and a comparative power value. The comparative power value is in linear correlation with the expected power value indicated by the corresponding information group, and the comparative power value is in linear correlation with the compensative factor indicated by the corresponding information group.

In one subembodiment, a linear coefficient between the comparative power value and the compensation factor indicated by the corresponding information group is a corresponding path loss.

In one subembodiment, a linear coefficient between the comparative power value and the expected power value indicated by the corresponding information group is 1.

Specifically, according to one aspect of the disclosure, the above method is characterized in that: K2 downlink radio signal(s) include(s) K2 downlink signaling(s) respectively, and the K2 downlink radio signal(s) is(are) a subset of the K downlink radio signals; the downlink signaling includes a transmit power control field, and the transmit power control fields in the K2 downlink signaling(s) all have an equal value; for any one given downlink radio signal among the K2 downlink radio signal(s), the maximum transmit power value in the information group corresponding to a transmitter of the given downlink radio signal is equal to a corresponding reference power value; and the K2 is a positive integer not greater than the K.

In one embodiment, the above method is characterized in that: among the K downlink radio signals, only the K2 downlink radio signals include downlink signalings for TCP, further reducing the complexity of implementation of the UE.

In one embodiment, a summation of the K2 and the K1 is equal to the K.

In one embodiment, the K2 is equal to the K.

In one embodiment, the transmit power control field is a TPC field.

In one embodiment, the phrase that the transmit power control fields in the K2 downlink signaling(s) all have an equal value refers that: the transmit power control fields in the K2 downlink signaling(s) are all equal to 1.

Specifically, according to one aspect of the disclosure, the above method is characterized in that: the K downlink radio signals are transmitted by K transmitters respectively, and the synchronization sequence is used for identifying a transmitter of the associated downlink radio signal.

In one embodiment, the transmitter is a cell.

In one embodiment, the K transmitters are K serving cells occupying a same frequency-domain resource.

In one embodiment, the transmitter is a base station.

In one embodiment, the transmitter is a TRP.

In one embodiment, the synchronization sequence is used for determining an identifier of a corresponding transmitter.

In one embodiment, the identifier is one of a PCI, a PLMN ID or an ECGI.

In one embodiment, the transmitter is a terminal.

The disclosure provides a method in a base station for wireless communication, wherein the method includes:

transmitting a first downlink radio signal; and receiving a first radio signal.

Herein, a transmit power value of the first radio signal is a first power value; K downlink radio signals are associated with K synchronization sequences respectively; the downlink radio signal includes at least one of a downlink reference signal or a synchronization signal, or the downlink radio signal includes a downlink signaling; the K downlink radio signals are used for determining the first power value; any two of the K synchronization sequences are different; the K is a positive integer greater than 1; the first downlink radio signal is one of the K downlink radio signals, and only the first downlink radio signal among the K downlink radio signals is transmitted by a transmitter of the first downlink radio signal.

In one embodiment, the base station includes multiple cells, a transmitter of the first downlink radio signal is one given cell among the multiple cells, and the given cell is a serving cell of a transmitter of the first radio signal.

In one embodiment, the base station includes multiple TRPs, a transmitter of the first downlink radio signal is one given TRP among the multiple TRPs, and the given TRP is a serving TRP of a transmitter of the first radio signal.

Specifically, according to one aspect of the disclosure, the above method includes:

transmitting K information groups.

Herein, the K information groups correspond to K transmitters respectively, and the K transmitters transmit the K downlink radio signals respectively; the information group includes at least one of a maximum transmit power value, an expected power value or a compensation factor; the first power value is a minimum power value among K reference power values, and the K reference power values are one-to-one corresponding to the K information groups; the transmitter of the first downlink radio signal is one of the K transmitters.

In one embodiment, the transmitting K information groups occurs before the receiving a first radio signal.

Specifically, according to one aspect of the disclosure, the above method is characterized in that: K1 downlink radio signal(s) is(are) used for determining K1 path loss(es) respectively; the K1 downlink radio signal(s) is(are) a subset of the K downlink radio signals, the K1 downlink radio signal(s) all include(s) at least one of the downlink reference signal or the synchronization signal, and the K1 is a positive integer not greater than the K; the K1 path loss(es) is(are) used for determining K1 reference power value(s), and the K1 reference power value(s) is(are) a subset of the K reference power values.

Specifically, according to one aspect of the disclosure, the above method is characterized in that: K2 downlink radio signal(s) include(s) K2 downlink signaling(s) respectively, and the K2 downlink radio signal(s) is(are) a subset of the K downlink radio signals; the downlink signaling includes a transmit power control field, and the transmit power control fields in the K2 downlink signaling(s) all have an equal value; for any one given downlink radio signal among the K2 downlink radio signal(s), the maximum transmit power value in the information group corresponding to a transmitter of the given downlink radio signal is equal to a corresponding reference power value; and the K2 is a positive integer not greater than the K.

Specifically, according to one aspect of the disclosure, the above method is characterized in that: the K downlink radio signals are transmitted by K transmitters respectively, and the synchronization sequence is used for identifying a transmitter of the associated downlink radio signal.

The disclosure provides a UE for wireless communication, wherein the UE includes:

a first receiver, to receive K downlink radio signals; and
a first transmitter, to transmit a first radio signal.

Herein, a transmit power value of the first radio signal is a first power value; the K downlink radio signals are associated with K synchronization sequences respectively; the downlink radio signal includes at least one of a downlink reference signal or a synchronization signal, or the downlink radio signal includes a downlink signaling; the K downlink radio signals are used for determining the first power value; any two of the K synchronization sequences are different; and the K is a positive integer greater than 1.

In one embodiment, the above UE for wireless communication is characterized in that: the first receiver further receives K information groups. The K information groups correspond to K transmitters respectively, and the K transmitters transmit the K downlink radio signals respectively. the information group includes at least one of a maximum transmit power value, an expected power value or a compensation factor. the first power value is a minimum power value among K reference power values, and the K reference power values are one-to-one corresponding to the K information groups.

In one embodiment, the above UE for wireless communication is characterized in that: the first receiver is further used for determining K1 path loss(es). K1 downlink radio signal(s) is(are) used for determining the K1 path loss(es) respectively. The K1 downlink radio signal(s) is(are) a subset of the K downlink radio signals, the K1 downlink radio signal(s) all include(s) at least one of the downlink reference signal or the synchronization signal, and the K1 is a positive integer not greater than the K. the K1 path loss(es) is(are) used for determining K1 reference power value(s), and the K1 reference power value(s) is(are) a subset of the K reference power values.

In one embodiment, the above UE for wireless communication is characterized in that: K2 downlink radio signal(s) include(s) K2 downlink signaling(s) respectively, and the K2 downlink radio signal(s) is(are) a subset of the K downlink radio signals. The downlink signaling includes a transmit power control field, and the transmit power control fields in the K2 downlink signaling(s) all have an equal value. For any one given downlink radio signal among the K2 downlink radio signal(s), the maximum transmit power value in the information group corresponding to a transmitter of the given downlink radio signal is equal to a corresponding reference power value. The K2 is a positive integer not greater than the K.

In one embodiment, the above UE for wireless communication is characterized in that: the K downlink radio signals are transmitted by K transmitters respectively, and the synchronization sequence is used for identifying a transmitter of the associated downlink radio signal.

The disclosure provides a base station for wireless communication, wherein the base station includes:

a second transmitter, to transmit a first downlink radio signal; and
a second receiver, to receive a first radio signal.

Herein, a transmit power value of the first radio signal is a first power value; K downlink radio signals are associated with K synchronization sequences respectively; the downlink radio signal includes at least one of a downlink reference signal or a synchronization signal, or the downlink radio signal includes a downlink signaling; the K downlink radio signals are used for determining the first power value; any two of the K synchronization sequences are different; the K is a positive integer greater than 1; the first downlink radio signal is one of the K downlink radio signals, and only the first downlink radio signal among the K downlink radio signals is transmitted by a transmitter of the first downlink radio signal.

In one embodiment, the above base station for wireless communication is characterized in that: the second transmitter further transmits K information groups. The K information groups correspond to K transmitters respectively, and the K transmitters transmit the K downlink radio signals respectively. the information group includes at least one of a maximum transmit power value, an expected power value or a compensation factor. the first power value is a minimum power value among K reference power values, and the K reference power values are one-to-one corresponding to the K information groups. The transmitter of the first downlink radio signal is one of the K transmitters.

In one embodiment, the above base station for wireless communication is characterized in that: K1 downlink radio signal(s) is(are) used for determining K1 path loss(es) respectively. The K1 downlink radio signal(s) is(are) a subset of the K downlink radio signals, the K1 downlink radio signal(s) all include(s) at least one of the downlink reference signal or the synchronization signal, and the K1 is a positive integer not greater than the K. the K1 path loss(es) is(are) used for determining K1 reference power value(s), and the K1 reference power value(s) is(are) a subset of the K reference power values.

In one embodiment, the above base station for wireless communication is characterized in that: K2 downlink radio signal(s) include(s) K2 downlink signaling(s) respectively, and the K2 downlink radio signal(s) is(are) a subset of the K downlink radio signals. The downlink signaling includes a transmit power control field, and the transmit power control fields in the K2 downlink signaling(s) all have an equal value. For any one given downlink radio signal among the K2 downlink radio signal(s), the maximum transmit power value in the information group corresponding to a transmitter of the given downlink radio signal is equal to a corresponding reference power value. The K2 is a positive integer not greater than the K.

In one embodiment, the above base station for wireless communication is characterized in that: the K downlink radio signals are transmitted by K transmitters respectively, and the synchronization sequence is used for identifying a transmitter of the associated downlink radio signal.

In one embodiment, compared with the prior art, the disclosure has the following technical advantages.

By designing a mechanism that the K downlink radio signals are used for determining the first power value, when the K downlink radio signals correspond to K different cells respectively, the first power value is determined on the basis that no neighbor cell interferences are produced to uplink receptions at the K different cells; when the K downlink radio signals correspond to K different ground terminals respectively, the first power value is determined on the basis that no neighbor cell interferences are produced to receptions at the K different ground terminals.

The first power value is a minimum power value among K reference power values, so as to ensure that the transmission of the UE does not cause strong interferences to all the K transmitters.

By designing K1 reference power values, the UE calculates the K1 reference power values only, reducing the complexity of implementation of the UE.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is incurred.

Embodiment 1

Figure 1:
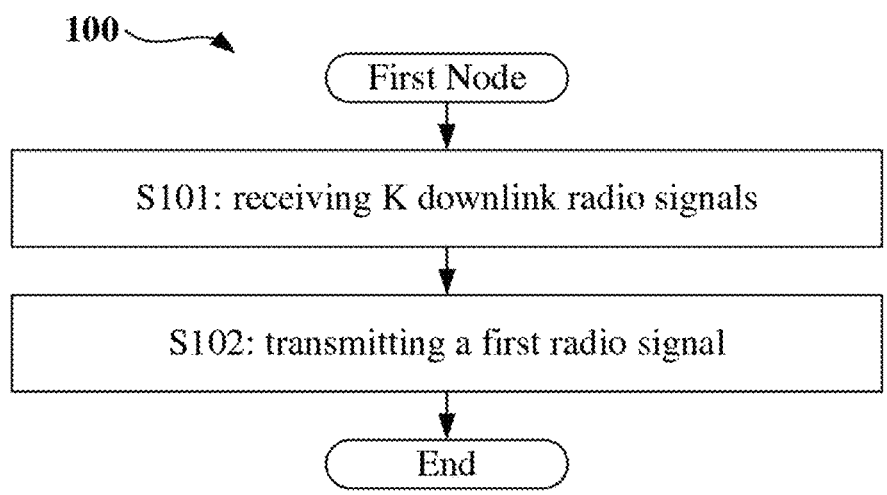
FIG. 1 is a flowchart of processing of a UE according to one embodiment of the disclosure.

Embodiment 1 illustrates an example of a flowchart of processing of a UE, as shown in FIG. 1. In 100 shown in FIG. 1, each box represents one step. In Embodiment 1, the UE in the disclosure receives K downlink radio signals in S101, and transmits a first radio signal in S102.

In Embodiment 1, a transmit power value of the first radio signal is a first power value; the K downlink radio signals are associated with K synchronization sequences respectively; the downlink radio signal includes at least one of a downlink reference signal or a synchronization signal, or the downlink radio signal includes a downlink signaling; the K downlink radio signals are used for determining the first power value; any two of the K synchronization sequences are different; and the K is a positive integer greater than 1.

Embodiment 2

Figure 2:
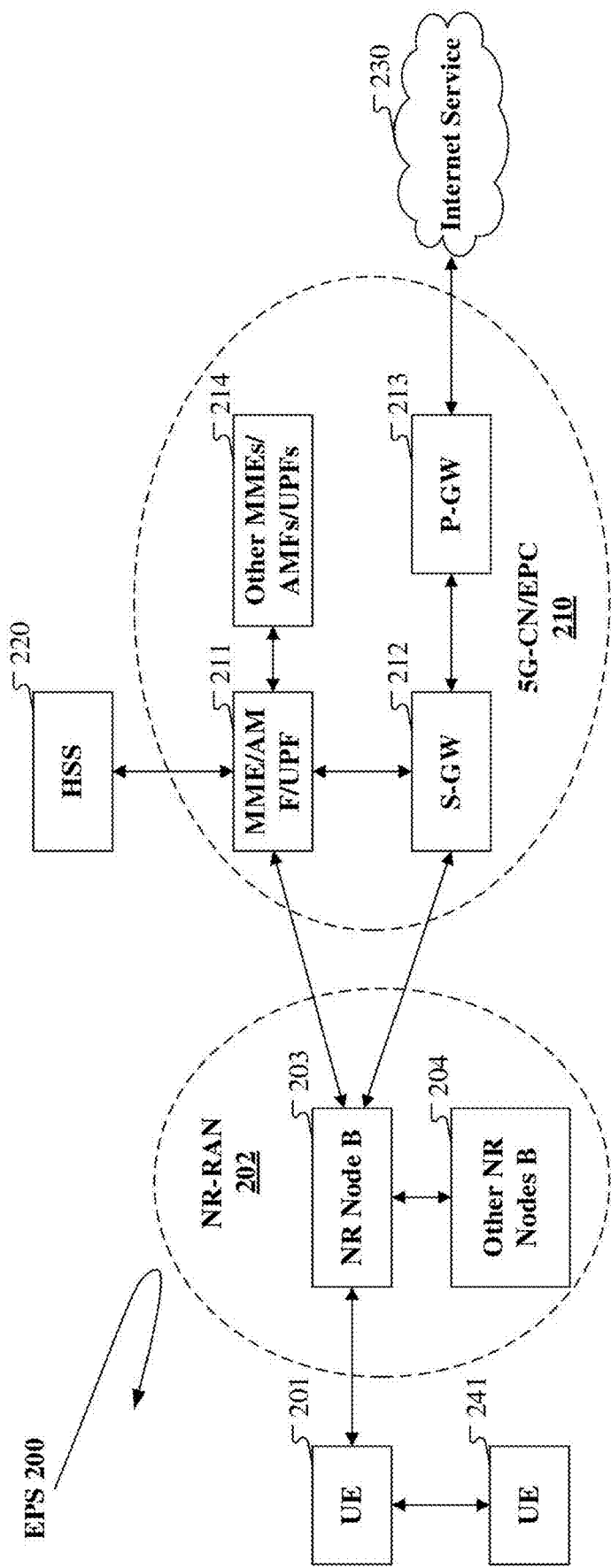
FIG. 2 is a diagram illustrating a network architecture according to one embodiment of the disclosure.

Embodiment 2 illustrates an example of a diagram of a network architecture, as shown in FIG. 2.

FIG. 2 is a diagram illustrating a network architecture 200 of 5G NR, LTE and Long-Term Evolution Advanced (LTE-A) systems. The 5G NR or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-territorial base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the UE in the disclosure.

In one embodiment, the gNB 203 corresponds to the base station in the disclosure.

Embodiment 3

Figure 3:
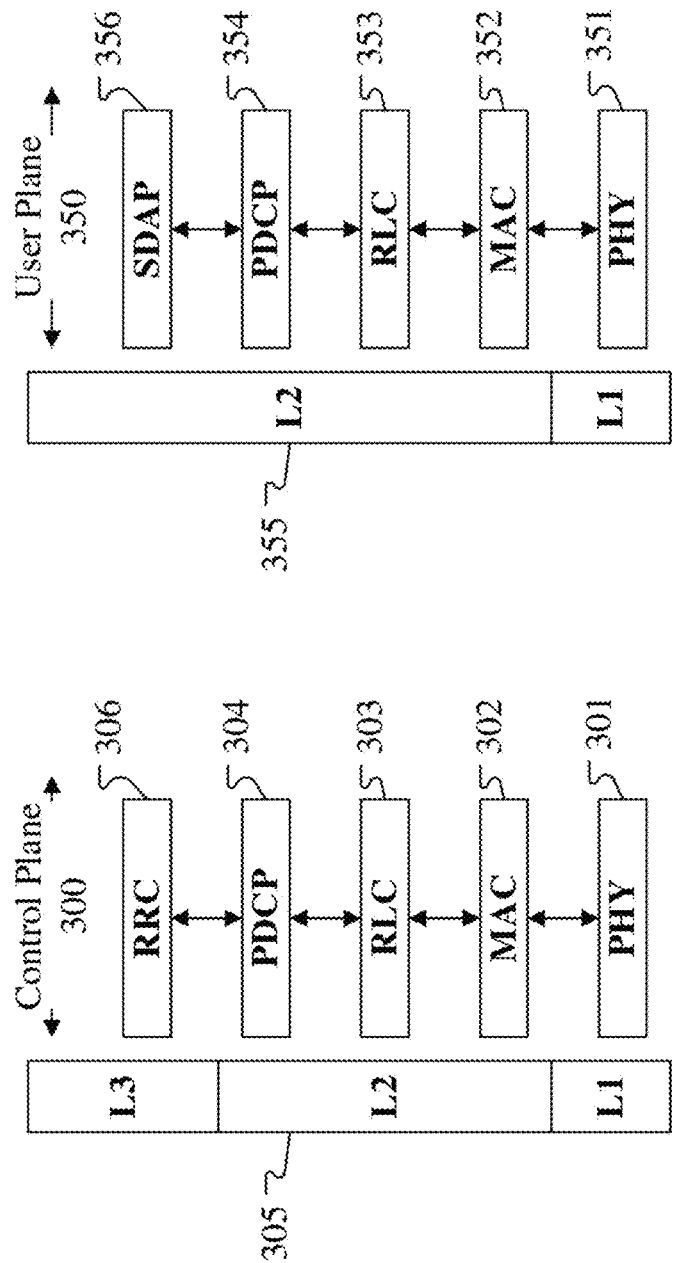
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 between a first communication node (UE, gNB or RSU in V2X) and a second communication node (gNB, UE or RSU in V2X) or between two UEs is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the first communication node and the second communication node and between two UEs over the PHY 301. The L2 layer 305 includes a Medium Access Control (MAC) sublayer 302, a Radio Link Control (RLC) sublayer 303, and a Packet Data Convergence Protocol (PDCP) sublayer 304, which are terminated at the second communication node. The PDCP sublayer 304 provides multiplexing between different radio bearers and logical channels. The PDCP sublayer 304 also provides security by encrypting packets and provides support for handover of the first communication node between the second communication nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first communication nodes. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second communication node and the first communication node. The radio protocol architecture of the user plane 350 includes a Layer 1 (L1 layer) and a Layer 2 (L2 layer); the radio protocol architecture for the first communication node and the second communication node in the user plane 350 on the PHY 301, the PDCP sublayer 354 in the L2 layer 305, the RLC sublayer 353 in the L2 layer 355 and the MAC sublayer 352 in the L2 layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first communication node may include several higher layers above the L2 layer 355, including a network layer (i.e. IP layer) terminated at the P-GW on the network side and an application layer terminated at the other end (i.e. a peer UE, a server, etc.) of the connection.

In one embodiment, the radio protocol architecture shown in FIG. 3 is applicable to the UE in the disclosure.

In one embodiment, the radio protocol architecture shown in FIG. 3 is applicable to the base station in the disclosure.

Embodiment 4

Figure 4:
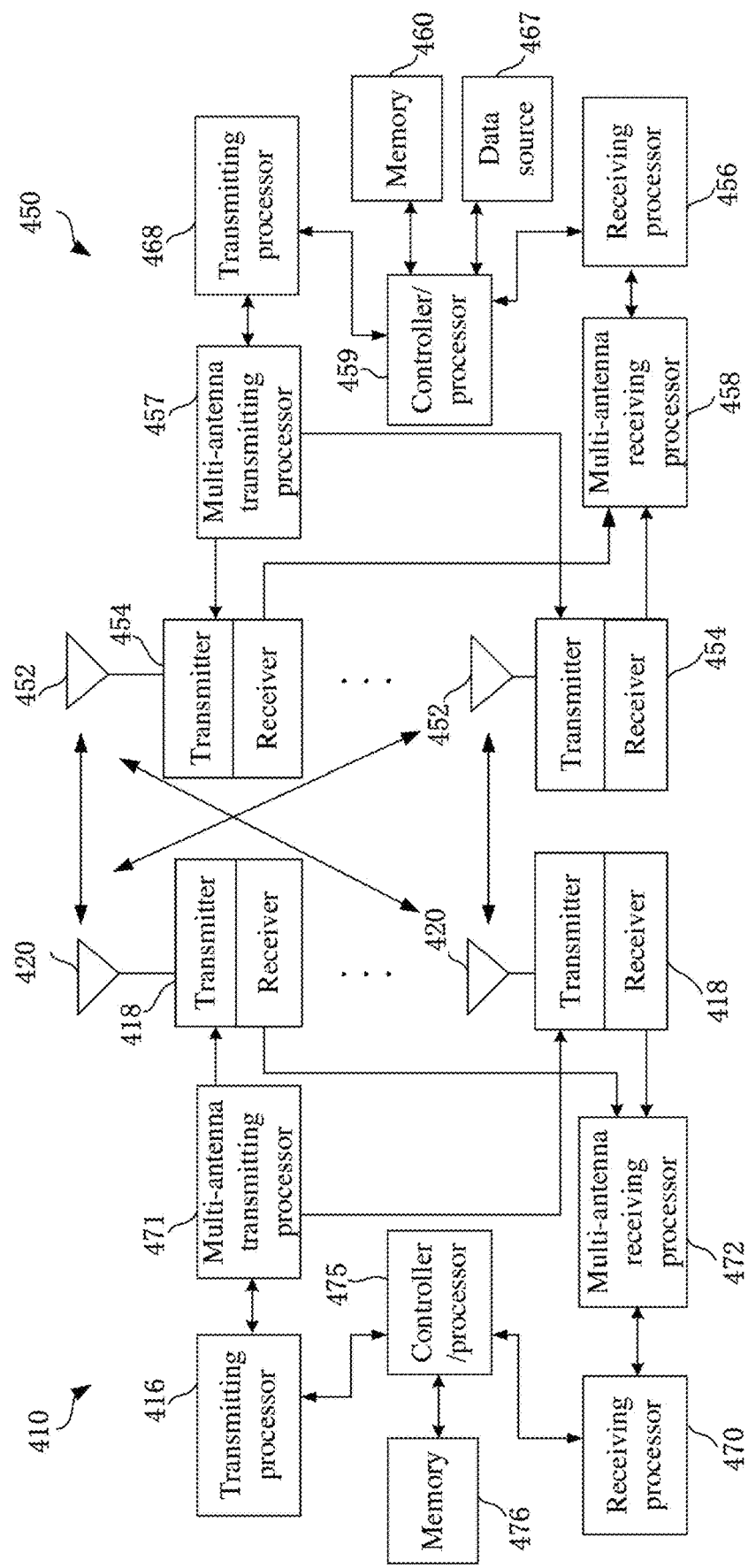
FIG. 4 is a diagram illustrating a first communication equipment and a second communication equipment according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 410 and mappings to signal clusters corresponding to different modulation schemes (i.e., BPSK, QPSK, M-PSK M-QAM, etc.). The multi-antenna transmitting processor 471 processes the encoded and modulated symbols by digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 by a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives K downlink radio signals, and transmits a first radio signal; a transmit power value of the first radio signal is a first power value; the K downlink radio signals are associated with K synchronization sequences respectively; the downlink radio signal includes at least one of a downlink reference signal or a synchronization signal, or the downlink radio signal includes a downlink signaling; the K downlink radio signals are used for determining the first power value; any two of the K synchronization sequences are different; and the K is a positive integer greater than 1.

In one embodiment, the first communication equipment 450 includes a memory that stores a computer readable instruction program. The computer readable instruction program generates an action when executed by at least one processor. The action includes: receiving K downlink radio signals, and transmitting a first radio signal; a transmit power value of the first radio signal is a first power value; the K downlink radio signals are associated with K synchronization sequences respectively; the downlink radio signal includes at least one of a downlink reference signal or a synchronization signal, or the downlink radio signal includes a downlink signaling; the K downlink radio signals are used for determining the first power value; any two of the K synchronization sequences are different; and the K is a positive integer greater than 1.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first downlink radio signal, and receives a first radio signal; a transmit power value of the first radio signal is a first power value; K downlink radio signals are associated with K synchronization sequences respectively; the downlink radio signal includes at least one of a downlink reference signal or a synchronization signal, or the downlink radio signal includes a downlink signaling; the K downlink radio signals are used for determining the first power value; any two of the K synchronization sequences are different; the K is a positive integer greater than 1; the first downlink radio signal is one of the K downlink radio signals, and only the first downlink radio signal among the K downlink radio signals is transmitted by a transmitter of the first downlink radio signal.

In one embodiment, the second communication equipment 410 includes a memory that stores a computer readable instruction program. The computer readable instruction program generates an action when executed by at least one processor. The action includes: transmitting a first downlink radio signal, and receiving a first radio signal; a transmit power value of the first radio signal is a first power value; K downlink radio signals are associated with K synchronization sequences respectively; the downlink radio signal includes at least one of a downlink reference signal or a synchronization signal, or the downlink radio signal includes a downlink signaling; the K downlink radio signals are used for determining the first power value; any two of the K synchronization sequences are different; the K is a positive integer greater than 1; the first downlink radio signal is one of the K downlink radio signals, and only the first downlink radio signal among the K downlink radio signals is transmitted by a transmitter of the first downlink radio signal.

In one embodiment, the first communication equipment 450 corresponds to the UE in the disclosure.

In one embodiment, the second communication equipment 410 corresponds to the base station in the disclosure.

In one embodiment, the first communication equipment 450 is one UE.

In one embodiment, the second communication equipment 410 is one base station.

In one embodiment, at least one of the antenna 452, the receiver 454, the multi-antenna receiving processor 458, the receiving processor 456 and the controller/processor 459 is used for receiving K downlink radio signals; and at least one of the antenna 420, the transmitter 418, the multi-antenna transmitting processor 471, the transmitting processor 416 and the controller/processor 475 is used for transmitting a first downlink radio signal.

In one embodiment, at least one of the antenna 452, the transmitter 454, the multi-antenna transmitting processor 457, the transmitting processor 468 and the controller/processor 459 is used for transmitting a first radio signal; and at least one of the antenna 420, the receiver 418, the multi-antenna receiving processor 472, the receiving processor 470 and the controller/processor 475 is used for receiving a first radio signal.

In one embodiment, at least one of the antenna 452, the receiver 454, the multi-antenna receiving processor 458, the receiving processor 456 and the controller/processor 459 is used for receiving K information groups; and at least one of the antenna 420, the transmitter 418, the multi-antenna transmitting processor 471, the transmitting processor 416 and the controller/processor 475 is used for transmitting K information groups.

In one embodiment, at least one of the antenna 452, the receiver 454, the multi-antenna receiving processor 458, the receiving processor 456 and the controller/processor 459 is used for determining K1 path losses.

Embodiment 5

Figure 5:
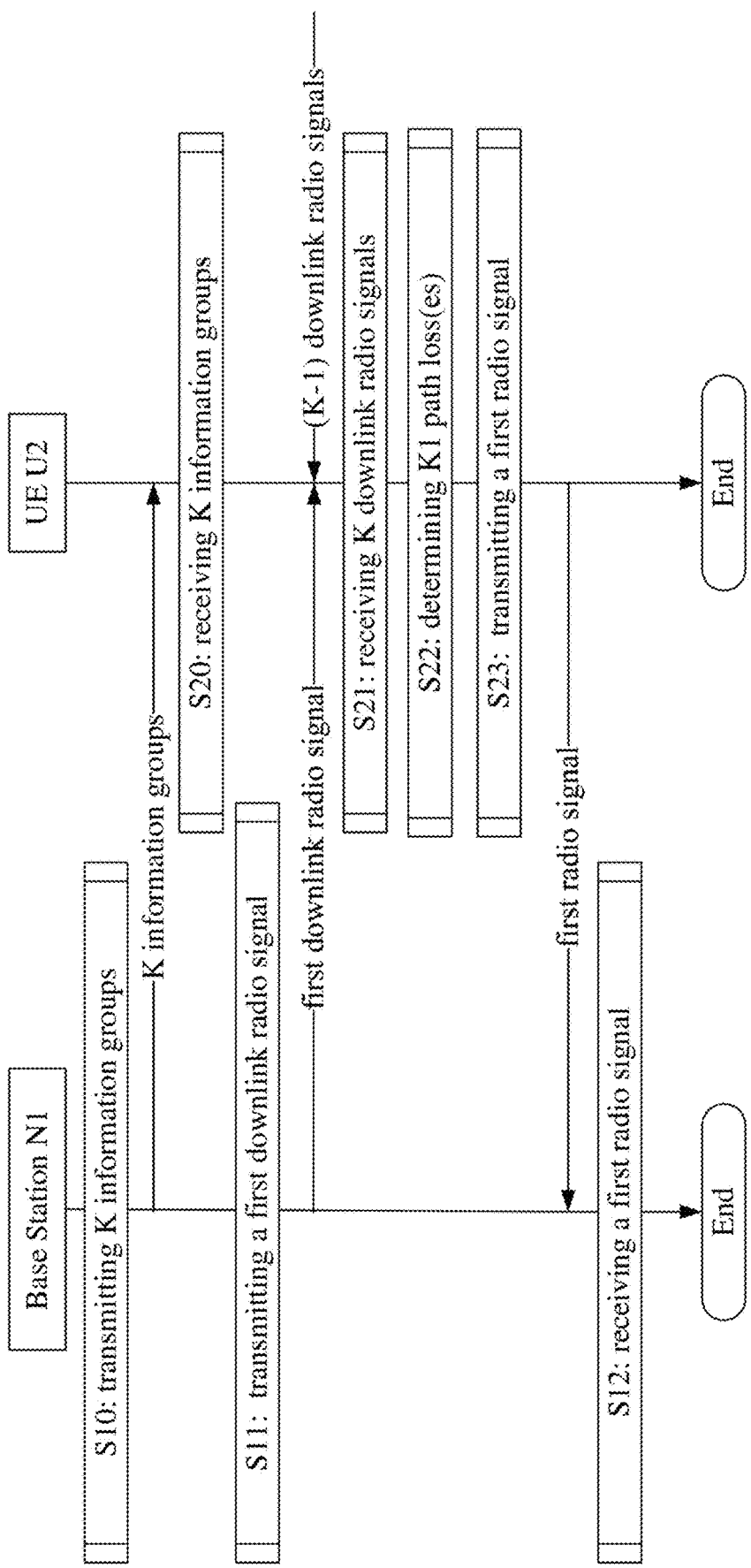
FIG. 5 is a flowchart of transmission of a first radio signal according to one embodiment of the disclosure.

Embodiment 5 illustrates an example of a flowchart of transmission of a first radio signal according to the disclosure, as shown in FIG. 5. In FIG. 5, a base station N1 is a maintenance base station for a serving cell of a UE U2.

The base station N1 transmits K information groups in S10, transmits a first downlink radio signal in S11, and receives a first radio signal in S12.

The UE U2 receives K information groups in S20, receives K downlink radio signals in S21, determines K1 path loss(es) in S22, and transmits a first radio signal in S23.

In Embodiment 5, a transmit power value of the first radio signal is a first power value. The K downlink radio signals are associated with K synchronization sequences respectively. The downlink radio signal includes at least one of a downlink reference signal or a synchronization signal, or the downlink radio signal includes a downlink signaling. the K downlink radio signals are used for determining the first power value. Any two of the K synchronization sequences are different. The K is a positive integer greater than 1. The K information groups correspond to K transmitters respectively, and the K transmitters transmit the K downlink radio signals respectively. the information group includes at least one of a maximum transmit power value, an expected power value or a compensation factor. the first power value is a minimum power value among K reference power values, and the K reference power values are one-to-one corresponding to the K information groups. The base station N1 is one of the K transmitters. K1 downlink radio signal(s) is(are) used for determining the K1 path loss(es) respectively. The K1 downlink radio signal(s) is(are) a subset of the K downlink radio signals, the K1 downlink radio signal(s) all include(s) at least one of the downlink reference signal or the synchronization signal, and the K1 is a positive integer not greater than the K. the K1 path loss(es) is(are) used for determining K1 reference power value(s), and the K1 reference power value(s) is(are) a subset of the K reference power values. K2 downlink radio signal(s) include(s) K2 downlink signaling(s) respectively, and the K2 downlink radio signal(s) is(are) a subset of the K downlink radio signals. The downlink signaling includes a transmit power control field, and the transmit power control fields in the K2 downlink signaling(s) all have an equal value. For any one given downlink radio signal among the K2 downlink radio signal(s), the maximum transmit power value in the information group corresponding to a transmitter of the given downlink radio signal is equal to a corresponding reference power value. The K2 is a positive integer not greater than the K. The K downlink radio signals are transmitted by K transmitters respectively, and the synchronization sequence is used for identifying a transmitter of the associated downlink radio signal.

In one subembodiment, the K downlink radio signals include (K−1) downlink radio signals shown in FIG. 5 and the first downlink radio signal.

In one subembodiment, the K information groups are carried through a UE-specific higher-layer signaling.

In one affiliated embodiment of the above subembodiment, the higher-layer signaling is a Radio Resource Control (RRC) layer signaling.

In one subembodiment, the K information groups are semi-statically configured.

In one subembodiment, a transport channel corresponding to the first radio signal is an Uplink Shared Channel (UL-SCH).

In one subembodiment, a transport channel corresponding to the first radio signal is a Sidelink Shared Channel (SL-SCH).

In one subembodiment, a transport channel corresponding to the first radio signal is a Sidelink Discovery Channel (SL-DCH).

In one subembodiment, a transport channel corresponding to the first radio signal is a Sidelink Broadcast Channel (SL-BCH).

Embodiment 6

Figure 6:
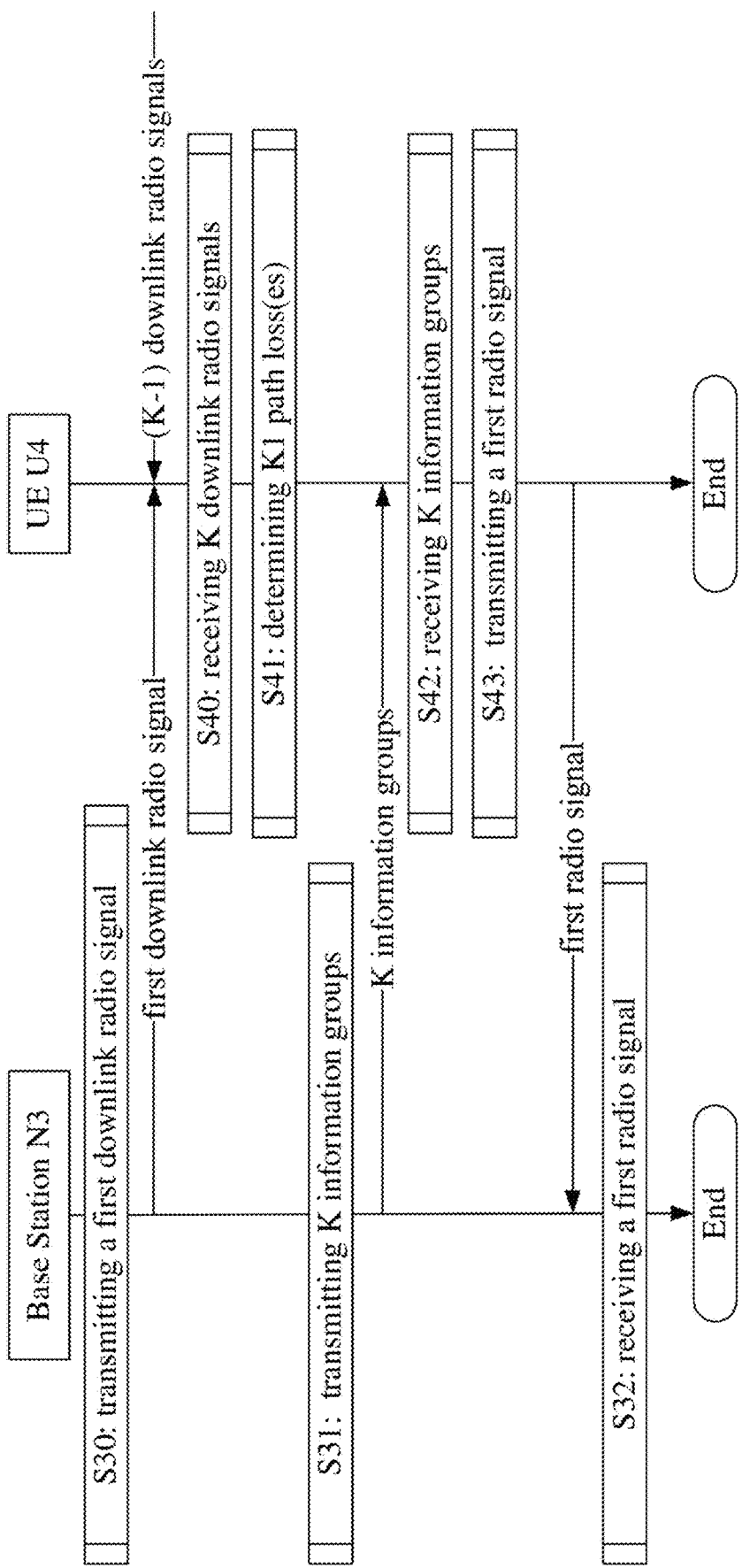
FIG. 6 is a flowchart of transmission of a first radio signal according to another embodiment of the disclosure.

Embodiment 6 illustrates an example of a flowchart of transmission of a first radio signal according to the disclosure, as shown in FIG. 6. In FIG. 6, a base station N3 is a maintenance base station for a serving cell of a UE U4.

The base station N3 transmits a first downlink radio signal in S30, transmits K information groups in S31, and receives a first radio signal in S32.

The UE U4 receives K downlink radio signals in S40, determines K1 path loss(es) in S41, receives K information groups in S42, and transmits a first radio signal in S43.

In Embodiment 6, a transmit power value of the first radio signal is a first power value. The K downlink radio signals are associated with K synchronization sequences respectively. The downlink radio signal includes at least one of a downlink reference signal or a synchronization signal, or the downlink radio signal includes a downlink signaling. the K downlink radio signals are used for determining the first power value. Any two of the K synchronization sequences are different. The K is a positive integer greater than 1. The K information groups correspond to K transmitters respectively, and the K transmitters transmit the K downlink radio signals respectively. the information group includes at least one of a maximum transmit power value, an expected power value or a compensation factor. the first power value is a minimum power value among K reference power values, and the K reference power values are one-to-one corresponding to the K information groups. The base station N3 is one of the K transmitters. K1 downlink radio signal(s) is(are) used for determining the K1 path loss(es) respectively. The K1 downlink radio signal(s) is(are) a subset of the K downlink radio signals, the K1 downlink radio signal(s) all include(s) at least one of the downlink reference signal or the synchronization signal, and the K1 is a positive integer not greater than the K. the K1 path loss(es) is(are) used for determining K1 reference power value(s), and the K1 reference power value(s) is(are) a subset of the K reference power values. K2 downlink radio signal(s) include(s) K2 downlink signaling(s) respectively, and the K2 downlink radio signal(s) is(are) a subset of the K downlink radio signals. The downlink signaling includes a transmit power control field, and the transmit power control fields in the K2 downlink signaling(s) all have an equal value. For any one given downlink radio signal among the K2 downlink radio signal(s), the maximum transmit power value in the information group corresponding to a transmitter of the given downlink radio signal is equal to a corresponding reference power value. The K2 is a positive integer not greater than the K. The K downlink radio signals are transmitted by K transmitters respectively, and the synchronization sequence is used for identifying a transmitter of the associated downlink radio signal.

In one subembodiment, the K downlink radio signals include (K−1) downlink radio signals shown in FIG. 6 and the first downlink radio signal.

In one subembodiment, the K information groups are carried through a UE-specific higher-layer signaling.

In one affiliated embodiment of the above subembodiment, the higher-layer signaling is an RRC layer signaling.

In one subembodiment, the K information groups are semi-statically configured.

In one subembodiment, a transport channel corresponding to the first radio signal is a UL-SCH.

In one subembodiment, a transport channel corresponding to the first radio signal is an SL-SCH.

In one subembodiment, a transport channel corresponding to the first radio signal is an SL-DCH.

In one subembodiment, a transport channel corresponding to the first radio signal is an SL-BCH.

Embodiment 7

Figure 7:
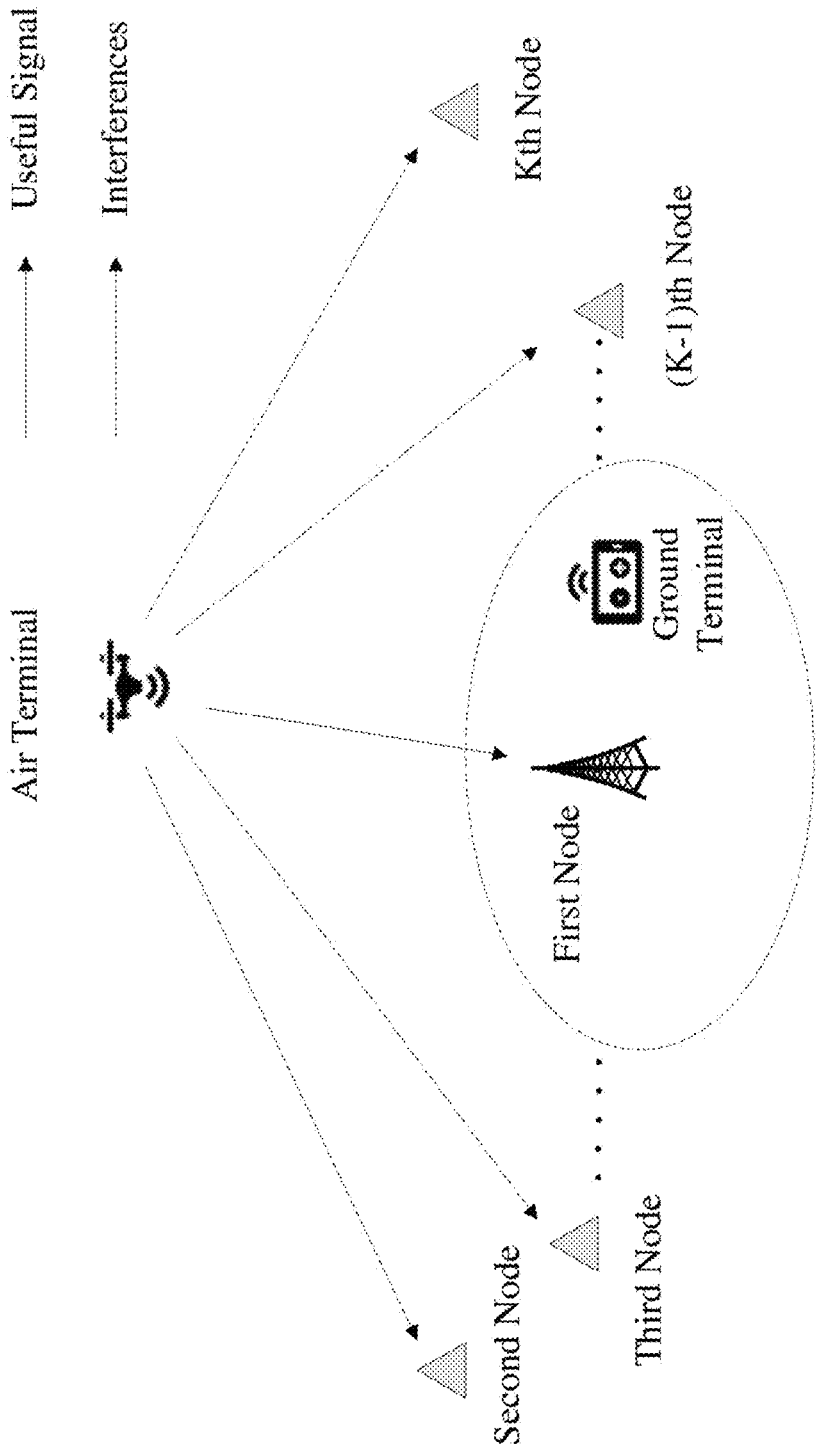
FIG. 7 is a diagram illustrating an application scenario according to the disclosure.

Embodiment 7 illustrates an example of a diagram of an application scenario according to the disclosure, as shown in FIG. 7. In FIG. 7, an air terminal corresponds to the UE in the disclosure, and a first node corresponds to a transmitter of the first downlink radio signal in the disclosure. A ground terminal is a terminal at an opposite end of the air terminal, the ground terminal and the air terminal perform D2D communication. A second node, and a third node to a Kth node correspond to (K−1) ones of transmitters of the K downlink radio signals in the disclosure respectively. The first node to the Kth node constitute K transmitters that are one-to-one corresponding to the K downlink radio signals. The air terminal transmits the first radio signal in the disclosure. The K information groups in the disclosure correspond to the first node to the Kth node respectively. The transmission from the air terminal to the ground terminal produces interferences to receptions at the second node to the Kth node. The K information groups in the disclosure include a first information group to a Kth information group, and the first information group to the Kth information group correspond to the first node to the Kth node respectively.

In one subembodiment, the first node is a serving cell of the air terminal.

In one subembodiment, the air terminal and the ground terminal belong to one D2D pair.

In one subembodiment, the first node is a serving cell of the ground terminal.

In one subembodiment, the first radio signal is received by the ground terminals simultaneously.

In one subembodiment, the first radio signal can be detected by the second node to the Kth node.

In one subembodiment, a given node is a neighbor cell of the first node, a given downlink radio signal transmitted by the given node can be detected by the air terminal. The given node is any one of the second node to the Kth node, and the given downlink radio signal is a downlink radio signal transmitted by the given node among the K downlink radio signals.

In one subembodiment, a given node is a terminal device in a neighbor cell of the first node, a given downlink radio signal transmitted by the given node can be detected by the air terminal. The given node is any one of the second node to the Kth node, and the given downlink radio signal is a downlink radio signal transmitted by the given node among the K downlink radio signals.

Embodiment 8

Figure 8:
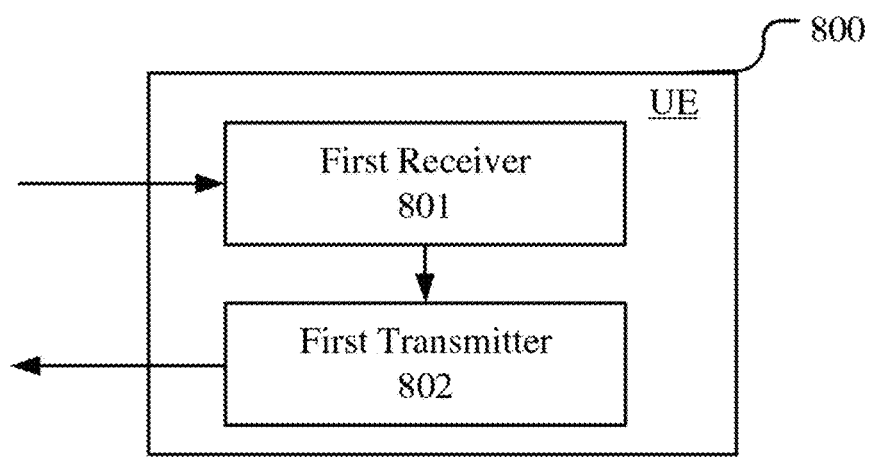
FIG. 8 is a structure block diagram illustrating a processing device in a UE according to one embodiment of the disclosure.

Embodiment 8 illustrates an example of a structure block diagram of a processing device in a UE, as shown in FIG. 8. In FIG. 8, the processing device 800 in the UE includes a first receiver 801 and a first transmitter 802.

The first receiver 801 receives K downlink radio signals.

The first transmitter 802 transmits a first radio signal.

In Embodiment 8, a transmit power value of the first radio signal is a first power value. The K downlink radio signals are associated with K synchronization sequences respectively. The downlink radio signal includes at least one of a downlink reference signal or a synchronization signal, or the downlink radio signal includes a downlink signaling. the K downlink radio signals are used for determining the first power value. Any two of the K synchronization sequences are different. The K is a positive integer greater than 1.

In one subembodiment, the first receiver 801 further receives K information groups. The K information groups correspond to K transmitters respectively, and the K transmitters transmit the K downlink radio signals respectively. the information group includes at least one of a maximum transmit power value, an expected power value or a compensation factor. the first power value is a minimum power value among K reference power values, and the K reference power values are one-to-one corresponding to the K information groups.

In one subembodiment, the first receiver 801 determines K1 path loss(es). K1 downlink radio signal(s) is(are) used for determining the K1 path loss(es) respectively. The K1 downlink radio signal(s) is(are) a subset of the K downlink radio signals, the K1 downlink radio signal(s) all include(s) at least one of the downlink reference signal or the synchronization signal, and the K1 is a positive integer not greater than the K. the K1 path loss(es) is(are) used for determining K1 reference power value(s), and the K1 reference power value(s) is(are) a subset of the K reference power values.

In one subembodiment, K2 downlink radio signal(s) include(s) K2 downlink signaling(s) respectively, and the K2 downlink radio signal(s) is(are) a subset of the K downlink radio signals. The downlink signaling includes a transmit power control field, and the transmit power control fields in the K2 downlink signaling(s) all have an equal value. For any one given downlink radio signal among the K2 downlink radio signal(s), the maximum transmit power value in the information group corresponding to a transmitter of the given downlink radio signal is equal to a corresponding reference power value. The K2 is a positive integer not greater than the K.

In one subembodiment, the K downlink radio signals are transmitted by K transmitters respectively, and the synchronization sequence is used for identifying a transmitter of the associated downlink radio signal.

In one embodiment, the first receiver 801 includes at least the former four of the antenna 452, the receiver 454, the multi-antenna receiving processor 458, the receiving processor 456 and the controller/processor 459 illustrated in Embodiment 4.

In one embodiment, the first transmitter 802 includes at least the former four of the antenna 452, the transmitter 454, the multi-antenna transmitting processor 457, the transmitting processor 468 and the controller/processor 459 illustrated in Embodiment 4.

Embodiment 9

Figure 9:
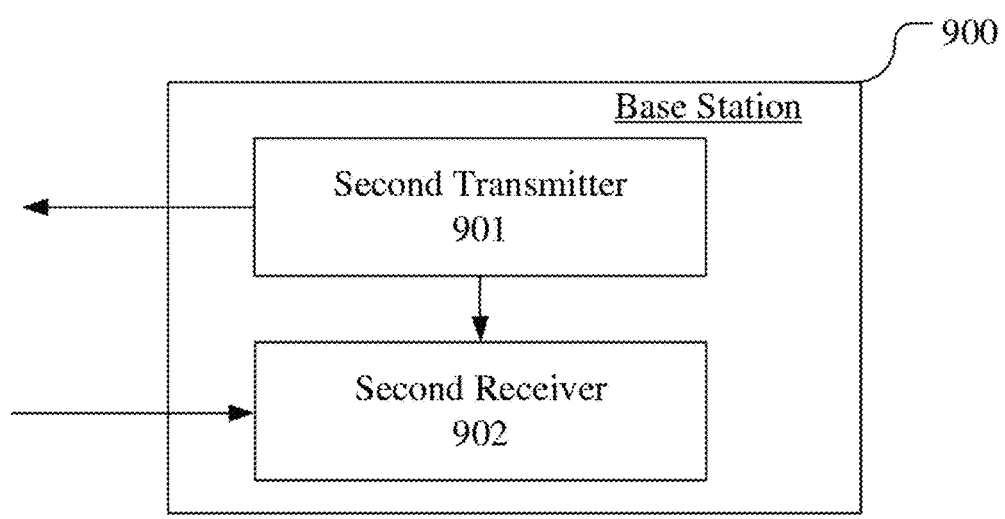
FIG. 9 is a structure block diagram illustrating a processing device in a base station according to one embodiment of the disclosure.

Embodiment 9 illustrates an example of a structure block diagram of a processing device in a base station, as shown in FIG. 9. In FIG. 9, the processing device 900 in the base station includes a second transmitter 901 and a second receiver 902.

The second transmitter 901 transmits a first downlink radio signal.

The second receiver 902 receives a first radio signal.

In Embodiment 9, a transmit power value of the first radio signal is a first power value. K downlink radio signals are associated with K synchronization sequences respectively. The downlink radio signal includes at least one of a downlink reference signal or a synchronization signal, or the downlink radio signal includes a downlink signaling. the K downlink radio signals are used for determining the first power value. Any two of the K synchronization sequences are different. The K is a positive integer greater than 1. The first downlink radio signal is one of the K downlink radio signals, and only the first downlink radio signal among the K downlink radio signals is transmitted by a transmitter of the first downlink radio signal.

In one subembodiment, the second transmitter 901 further transmits K information groups. The K information groups correspond to K transmitters respectively, and the K transmitters transmit the K downlink radio signals respectively. the information group includes at least one of a maximum transmit power value, an expected power value or a compensation factor. the first power value is a minimum power value among K reference power values, and the K reference power values are one-to-one corresponding to the K information groups. The transmitter of the first downlink radio signal is one of the K transmitters.

In one subembodiment, K1 downlink radio signal(s) is(are) used for determining the K1 path loss(es) respectively. The K1 downlink radio signal(s) is(are) a subset of the K downlink radio signals, the K1 downlink radio signal(s) all include(s) at least one of the downlink reference signal or the synchronization signal, and the K1 is a positive integer not greater than the K. the K1 path loss(es) is(are) used for determining K1 reference power value(s), and the K1 reference power value(s) is(are) a subset of the K reference power values.

In one subembodiment, K2 downlink radio signal(s) include(s) K2 downlink signaling(s) respectively, and the K2 downlink radio signal(s) is(are) a subset of the K downlink radio signals. The downlink signaling includes a transmit power control field, and the transmit power control fields in the K2 downlink signaling(s) all have an equal value. For any one given downlink radio signal among the K2 downlink radio signal(s), the maximum transmit power value in the information group corresponding to a transmitter of the given downlink radio signal is equal to a corresponding reference power value. The K2 is a positive integer not greater than the K.

In one subembodiment, the K downlink radio signals are transmitted by K transmitters respectively, and the synchronization sequence is used for identifying a transmitter of the associated downlink radio signal.

In one embodiment, the second transmitter 901 includes at least the former four of the antenna 420, the transmitter 418, the multi-antenna transmitting processor 471, the transmitting processor 416 and the controller/processor 475 illustrated in Embodiment 4.

In one embodiment, the second receiver 902 includes at least the former four of the antenna 420, the receiver 418, the multi-antenna receiving processor 472, the receiving processor 470 and the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the present disclosure include but not limited to unmanned air-interface vehicles, communication modules on unmanned air-interface vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base stations, gNBs (NR nodes B), TRPs, and other radio communication equipment. The base station in the disclosure includes but not limited to macro-cellular base stations, micro-cellular base stations, home base stations, relay base station, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
receiving K information groups;
determining K path losses;
receiving K downlink radio signals; and
transmitting a first radio signal;
wherein a transmit power value of the first radio signal is a first power value; the K downlink radio signals are associated with K synchronization sequences respectively; the downlink radio signal comprises at least one of a downlink reference signal or a synchronization signal, or the downlink radio signal comprises a downlink signaling; the K downlink radio signals are used for determining the first power value; any two of the K synchronization sequences are different; and the K is a positive integer greater than 1; the K information groups correspond to K transmitters respectively, and the K transmitters transmit the K downlink radio signals respectively; the information group comprises at least one of a maximum transmit power value, an expected power value or a compensation factor; the first power value is a minimum power value among K reference power values, and the K information groups are used to determine the K reference power values respectively; the K downlink radio signals are used for determining the K path losses respectively; the K downlink radio signals all comprise at least one of the downlink reference signal or the synchronization signal; the K path losses are used for determining the K reference power values.

2. The method according to claim 1, wherein K2 downlink radio signal(s) comprise(s) K2 downlink signaling(s) respectively, and the K2 downlink radio signal(s) is(are) a subset of the K downlink radio signals; the downlink signaling comprises a transmit power control field, and the transmit power control fields in the K2 downlink signaling(s) all have an equal value; for any one given downlink radio signal among the K2 downlink radio signal(s), the maximum transmit power value in the information group corresponding to a transmitter of the given downlink radio signal is equal to a corresponding reference power value; and the K2 is a positive integer not greater than the K.

3. The method according to claim 1, wherein the K downlink radio signals are transmitted by K transmitters respectively, and the synchronization sequence is used for identifying a transmitter of the associated downlink radio signal.

4. A method in a base station for wireless communication, comprising:
transmitting K information groups;
transmitting a first downlink radio signal; and
receiving a first radio signal;
wherein a transmit power value of the first radio signal is a first power value; K downlink radio signals are associated with K synchronization sequences respectively; the downlink radio signal comprises at least one of a downlink reference signal or a synchronization signal, or the downlink radio signal comprises a downlink signaling; the K downlink radio signals are used for determining the first power value; any two of the K synchronization sequences are different; the K is a positive integer greater than 1; the first downlink radio signal is one of the K downlink radio signals, and only the first downlink radio signal among the K downlink radio signals is transmitted by a transmitter of the first downlink radio signal; the K information groups correspond to K transmitters respectively, and the K transmitters transmit the K downlink radio signals respectively; the information group comprises at least one of a maximum transmit power value, an expected power value or a compensation factor; the first power value is a minimum power value among K reference power values, and the K information groups are used to determine the K reference power values respectively; the transmitter of the first downlink radio signal is one of the K transmitters; the K downlink radio signals are used for determining K path losses respectively; the K downlink radio signals all comprise at least one of the downlink reference signal or the synchronization signal; the K path losses are used for determining the K reference power values.

5. The method according to claim 4, wherein K2 downlink radio signal(s) comprise(s) K2 downlink signaling(s) respectively, and the K2 downlink radio signal(s) is(are) a subset of the K downlink radio signals; the downlink signaling comprises a transmit power control field, and the transmit power control fields in the K2 downlink signaling(s) all have an equal value; for any one given downlink radio signal among the K2 downlink radio signal(s), the maximum transmit power value in the information group corresponding to a transmitter of the given downlink radio signal is equal to a corresponding reference power value; and the K2 is a positive integer not greater than the K.

6. The method according to claim 4, wherein the K downlink radio signals are transmitted by K transmitters respectively, and the synchronization sequence is used for identifying a transmitter of the associated downlink radio signal.

7. A UE for wireless communication, comprising:
a first receiver, to receive K information groups; to receive K downlink radio signals; to determine K path losses; and
a first transmitter, to transmit a first radio signal;
wherein a transmit power value of the first radio signal is a first power value; the K downlink radio signals are associated with K synchronization sequences respectively; the downlink radio signal comprises at least one of a downlink reference signal or a synchronization signal, or the downlink radio signal comprises a downlink signaling; the K downlink radio signals are used for determining the first power value; any two of the K synchronization sequences are different; and the K is a positive integer greater than 1; the K information groups correspond to K transmitters respectively, and the K transmitters transmit the K downlink radio signals respectively; the information group comprises at least one of a maximum transmit power value, an expected power value or a compensation factor; the first power value is a minimum power value among K reference power values, and the K information groups are used to determine the K reference power values respectively; the K downlink radio signals are used for determining the K path losses respectively; the K downlink radio signals all comprise at least one of the downlink reference signal or the synchronization signal; the K path losses are used for determining the K reference power values.

8. A UE according to claim 7, wherein K2 downlink radio signal(s) comprise(s) K2 downlink signaling(s) respectively, and the K2 downlink radio signal(s) is(are) a subset of the K downlink radio signals; the downlink signaling comprises a transmit power control field, and the transmit power control fields in the K2 downlink signaling(s) all have an equal value; for any one given downlink radio signal among the K2 downlink radio signal(s), the maximum transmit power value in the information group corresponding to a transmitter of the given downlink radio signal is equal to a corresponding reference power value; and the K2 is a positive integer not greater than the K.

9. A UE according to claim 7, wherein the K downlink radio signals are transmitted by K transmitters respectively, and the synchronization sequence is used for identifying a transmitter of the associated downlink radio signal.

10. A base station for wireless communication, comprising:
 a second transmitter, to transmit K information groups; to transmit a first downlink radio signal; and
 a second receiver, to receive a first radio signal;
 wherein a transmit power value of the first radio signal is a first power value; K downlink radio signals are associated with K synchronization sequences respectively; the downlink radio signal comprises at least one of a downlink reference signal or a synchronization signal, or the downlink radio signal comprises a downlink signaling; the K downlink radio signals are used for determining the first power value; any two of the K synchronization sequences are different; the K is a positive integer greater than 1; the first downlink radio signal is one of the K downlink radio signals, and only the first downlink radio signal among the K downlink radio signals is transmitted by a transmitter of the first downlink radio signal; the K information groups correspond to K transmitters respectively, and the K transmitters transmit the K downlink radio signals respectively; the information group comprises at least one of a maximum transmit power value, an expected power value or a compensation factor; the first power value is a minimum power value among K reference power values, and the K information groups are used to determine the K reference power values respectively; the transmitter of the first downlink radio signal is one of the K transmitters; the K downlink radio signals are used for determining K path losses respectively; the K downlink radio signals all comprise at least one of the downlink reference signal or the synchronization signal; the K path losses are used for determining the K reference power values.

11. The base station according to claim 10, wherein K2 downlink radio signal(s) comprise(s) K2 downlink signaling(s) respectively, and the K2 downlink radio signal(s) is(are) a subset of the K downlink radio signals; the downlink signaling comprises a transmit power control field, and the transmit power control fields in the K2 downlink signaling(s) all have an equal value; for any one given downlink radio signal among the K2 downlink radio signal(s), the maximum transmit power value in the information group corresponding to a transmitter of the given downlink radio signal is equal to a corresponding reference power value; and the K2 is a positive integer not greater than the K.

12. The base station according to claim 10, wherein the K downlink radio signals are transmitted by K transmitters respectively, and the synchronization sequence is used for identifying a transmitter of the associated downlink radio signal.

* * * * *